United States Patent [19]

Kishimura et al.

[11] Patent Number: 4,935,475

[45] Date of Patent: Jun. 19, 1990

[54] PROCESS FOR PRODUCING CYCLOOLEFIN RANDOM COPOLYMER

[75] Inventors: Kotaroh Kishimura; Hideaki Yamaguchi, both of Iwakuni; Syuji Minami, Ohtake, all of Japan

[73] Assignee: Mitsui Petrochemical Industries, Ltd., Tokyo, Japan

[21] Appl. No.: 251,888

[22] Filed: Sep. 30, 1988

[30] Foreign Application Priority Data

Oct. 2, 1987 [JP] Japan .................................. 62-248113

[51] Int. Cl.$^5$ ............................ C08F 2/06; C08F 6/06; C08F 6/08
[52] U.S. Cl. .................................. 526/169.2; 526/280; 526/281; 528/482
[58] Field of Search ..................... 528/482; 526/169.2, 526/281, 280

[56] References Cited

U.S. PATENT DOCUMENTS 3,478,002 11/1969 Nakaguchi et al. ............. 526/281 X
4,016,349 4/1977 McKenna ............................ 528/482

FOREIGN PATENT DOCUMENTS 985848 3/1976 Canada .................................. 528/482
0203799 12/1986 European Pat. Off. ............. 526/281

OTHER PUBLICATIONS

Concise Chemical and Technical Dictionary, H. Bennett (ed.), Chemical Publishing Co., N.Y., N.Y., 1974, 708, 1130.

Primary Examiner—Joseph L. Schofer
Assistant Examiner—F. M. Teskin
Attorney, Agent, or Firm—Sherman and Shalloway

[57] ABSTRACT

A process for producing a cycloolefin random copolymer, which comprises
(1) copolymerizing (a) ethylene or both ethylene and an alpha-olefin having at least 3 carbon atoms with (b) a cycloolefin such as octahydronaphthalenes and bicyclo[2,2,1]hept-2-ene in the presence of (c) a catalyst formed from a soluble vanadium compound and an organoaluminum compound at least one of which has halogen, in (d) a liquid phase composed of a hydrocarbon medium to form a solution of a cycloolefin random copolymer, and
(2) contacting the resulting copolymer solution with (e) an adsorbent containing a metal cation.

8 Claims, No Drawings

PROCESS FOR PRODUCING CYCLOOLEFIN RANDOM COPOLYMER

This invention relates to a process for producing a cycloolefinic random copolymer. More specifically, it relates to a process for producing a cycloolefin random copolymer having excellent transparency, thermal resistance, heat aging resistance, chemical resistance, solvent resistance, dielectric properties and mechanical properties and being substantially free from a by-product containing halogen.

U.S. Pat. No. 2,883,372 discloses a copolymer of ethylene and 2,3-dihydrodicyclopentadiene. This copolymer shows an excellent balance between rigidity and transparency, but has inferior thermal resistance as shown by its glass transition temperature of about 100° C. A copolymer of ethylene and 5-ethylidene-2-norbornene has the same defect.

Japanese Patent Publication No. 14910/1971 proposes a homopolymer of 1,4,5,6-dimethano-1,2,3,4,4a,5,8,8a-octahydronaphthalene. This polymer, however, has inferior thermal resistance or heat aging resistance.

Japanese Laid-Open Patent Publication No. 127728/1983 proposes a homopolymer of 1,4,5,8-dimethano-1,2,3,4,4a,5,8,8a-octahydronaphthalene and a copolymer of it with a norbornene-type comonomer. As can be seen from the description of this patent document, these polymers are ring-opened polymers. Ring-opened polymers have poor thermal resistance and heat aging resistance because they have an unsaturated bond in the main chain.

U.S. Pat. No. 4,614,778 and its corresponding EP-A-156464 disclose that a cycloolefin random copolymer composed of ethylene with a specific bulky cycloolefin has transparency and a well-balanced combination of thermal resistance, heat aging resistance, chemical resistance, solvent resistance, dielectric properties and mechanical properties, and exhibits excellent performance in optical material applications such as optical memory discs and optical fibers.

The present inventors found that when a cycloolefin-type random copolymer is produced by using a halogen-containing catalyst, it contains a halogenation product of the cycloolefin as a by-product and has a much higher softening point than ordinary olefinic polymers. Accordingly, when this copolymer is molded under heat, a hydrogen halide such as hydrogen chloride is evolved from even a small amount of the halogen contained in the copolymer, and corrodes the molding machine. Removal of the halogenated product of the cycloolefin requires a treatment process which is industrially disadvantageous and comprises putting a large quantity of a poor solvent such as acetone in a copolymer solution formed by copolymerizing ethylene or ethylene and an alpha-olefin having at least 3 carbon atoms with a cycloolefin thereby to precipitate the copolymer, separating it from the liquid-phase portion, and extract the copolymer with hot acetone.

It is an object of this invention therefore to provide an industrially advantageous process for producing a cycloolefin random copolymer.

Another object of this invention is to provide a process for producing a cycloolefin random copolymer having excellent transparency, thermal resistance, heat aging resistance, chemical resistance, solvent resistance, dielectric properties and mechanical properties with industrial ease and advantage.

Further objects and advantages of this invention will be apparent from the following description.

According to this invention, these objects and advantages are achieved by a process for producing a cycloolefin random copolymer, which comprises (1) copolymerizing (a) ethylene or both ethylene and an alpha-olefin having at least 3 carbon atoms with (b) at least one cycloolefin selected from the group consisting of unsaturated monomers of the following formula (I)

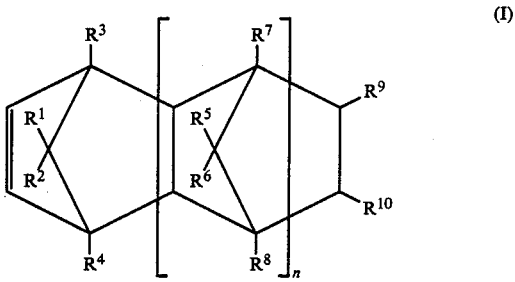

wherein n is 0 or a positive integer, and each of $R^1$ to $R^{10}$ represents a halogen atom or a hydrocarbon group, and unsaturated monomers of the following formula (II)

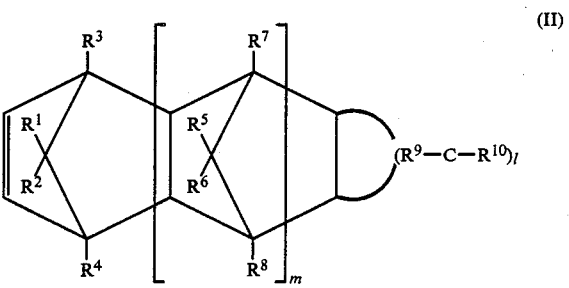

wherein m is 0 or a positive integer, and $R^1$ to $R^{10}$ are as defined above, and l is an integer of at least 3, in the presence of (c) a catalyst formed from a soluble vanadium compound and an organoaluminum compound at least one of which has halogen, in (d) a liquid phase composed of a hydrocarbon medium to form a solution of a cycloolefin random copolymer, and (2) contacting the resulting copolymer solution with (e) an adsorbent containing a metal cation.

The process of this invention comprises (1) a step of forming a solution of a cycloolefin random copolymer and (2) a step of treating the copolymer solution with an adsorbent.

The catalyst (c) used in step (1) is formed from a soluble vanadium compound and an organoaluminum compound. The soluble vanadium compound used as an ingredient of the catalyst is a vanadium compound soluble in a hydrocarbon medium in the polymerization reaction system. Examples include vanadium compounds of the general formula $VO(OR)_aX_b$ or $V(OR)_cX_d$ where R is a hydrocarbon group, X is a halogen atom, $0 \leq a \leq 3$, $0 \leq b \leq 3$, $2 \leq a+b \leq 3$, $0 \leq c \leq 4$, $0 \leq d \leq 4$, and $3 \leq c+d \leq 4$, and adducts of these vanadium compounds with electron donors. Specific examples include $VOCl_3$, $VO(OC_2H_5)Cl_2$, $VO(OC_2H_5)_2Cl$, VO(O-iso-C₃H₇)Cl₂, VO(O-n-C₄H₉)Cl₂, VO(OC₂H₅)₃, VOBr₂, VCl₄, VOCl₂, VO(O-n-C₄H₉)₃, and VCl₃·20C₈H₁₇OH.

The electron donors which may be used in the preparation of the soluble vanadium catalyst component include, for example, oxygen-containing electron donors such as alcohols, phenols, ketones, aldehydes, carboxylic acids, organic or inorganic acid esters, ethers, acid amides, acid anhydrides and alkoxysilanes, and nitrogen-containing electron donors such as ammonia, amines, nitriles and isocyanates. Specific examples include alcohols having 1 to 18 carbon atoms such as methanol, ethanol, propanol, pentanol, hexanol, octanol, dodecanol, octadecyl alcohol, oleyl alcohol, benzyl alcohol, phenylethyl alcohol, cumyl alcohol, isopropyl alcohol and isopropylbenzyl alcohol; phenols having 6 to 20 carbon atoms such as phenol, cresol, xylenol, ethylphenol, propylphenol, nonylphenol, cumylphenol and naphthol; ketones having 3 to 15 carbon atoms such as acetone, methyl ethyl ketone, methyl isobutyl ketone, acetophenone, benzophenone and benzoquinone; aldehydes having 2 to 15 carbon atoms such as acetaldehyde, propionaldehyde, octyl aldehyde, benzaldehyde, tolualdehyde and naphthaldehyde; organic acid esters having 2 to 30 carbon atoms such as methyl formate, methyl acetate, ethyl acetate, vinyl acetate, propyl acetate, octyl acetate, cyclohexyl acetate, ethyl propionate, methyl butyrate, ethyl valerate, methyl chloroacetate, ethyl dichloroacetate, methyl methacrylate, ethyl crotonate, ethyl cyclohexanecarboxylate, methyl benzoate, ethyl benzoate, propyl benzoate, butyl benzoate, octyl benzoate, cyclohexyl benzoate, phenyl benzoate, benzyl benzoate, methyl toluate, ethyl toluate, amyl toluate, ethyl ethylbenzoate, methyl anisate, n-butylmaleate, diisobutyl methylmalonate, di-n-hexyl cyclohexenecarboxylate, Nadic acid diethyl ester, diisopropyl tetrahydronaphthalate, diethyl phthalate, diisobutyl phthalate, di-n-butyl phthalate, di-2-ethylhexyl phthalate, gamma-butyrolactone, delta-valerolactone, coumarine, phthalide and ethylene carbonate; acid halides having 2 to 15 carbon atoms such as acetyl chloride, benzoyl chloride, toluoyl chloride and anisoyl chloride; ethers having 2 to 20 carbon atoms such as methyl ether, ethyl ether, isopropyl ether, butyl ether, amyl ether, tetrahydrofuran, anisole and diphenyl ether; acid amides such as acetamide, benzamide and toluamide; amines such as methylamine, ethylamine, diethylamine, tributylamine, piperidine, tribenzylamine, aniline, pyridine, picoline and tetramethylenediamine; nitriles such as acetonitrile, benzonitrile and tolunitrile; and alkoxysilanes such as ethyl silicate and diphenyldimethoxysilane. These electron donors may be used in combination.

Compounds having one Al-carbon bond at least in the molecule can be used advantageously as the organoaluminum compound catalyst ingredient.

Examples are given below.

(i) Organoaluminum compounds having one Al-carbon bond at least in the molecule, for example organoaluminum compounds of the general formula $$R_y^{11}Al(OR^{12})_zH_pX_q$$

wherein $R^{11}$ and $R^{12}$ may be identical or different, and each represents a hydrocarbon group usually having 1 to 15 carbon atoms, preferably 1 to 4 carbon atoms, X represents halogen, $0<y\leq 3$, $0\leq z<3$, $0\leq p<3$, $0\leq q<3$, and $y+z+p+q=3$, and (ii) complex alkylated products of a Group 1 metal and aluminum represented by the general formula $$M^1AlR_4^{11}$$

wherein $M^1$ represents Li, Na or K, and $R^{11}$ is as defined above.

Examples of the orgnoaluminum compounds belonging to (i) above include compounds of the general formula $$R_y^{11}Al(OR^{12})_{3-y}$$

wherein $R^{11}$ and $R^{12}$ are as defined above, and y is preferably a number represented by $1.5\leq y<3$, compounds of the general formula $$R^{11}AlX_{3-y}$$

wherein $R^{11}$ is as defined above, X represents halogen, and y is preferably a number represented by $0<y<3$, compounds of the general formula $$R^{11}AlH_{3-y}$$

wherein $R^{11}$ is as defined above, and y is preferably $2\leq y<3$, and compounds of the general formula $$R_y^{11}Al(OR^{12})_zX_q$$

wherein $R^{11}$ and $R^{12}$ are as defined above, X represents halogen, $0<y\leq 3$, $0\leq z<3$, $0\leq q<3$, and $y+z+q=3$.

Specific examples of the aluminum compounds belonging to (i) include trialkyl aluminums such as triethyl aluminum and tributyl aluminum; trialkenyl aluminums such as triisoprenyl aluminum; dialkyl aluminum alkoxides such as diethyl aluminum ethoxide and dibutyl aluminum butoxide; alkyl aluminum sesquialkoxides such as ethyl aluminum sesquiethoxide and butyl aluminum sesquibutoxide; partially alkoxylated alkyl aluminums having an average composition of the formula $R_{2.5}^1Al(OR^2)_{0.5}$; partially halogenated alkyl aluminums, for example, dialkyl aluminum halogenides such as diethyl aluminum chloride, dibutyl aluminum chloride and diethyl aluminum bromide, alkyl aluminum sesquihalogenides such as ethyl aluminum sesquichloride, butyl aluminum sesquichloride and ethyl aluminum sesquibromide, and alkyl aluminum dihalides such as ethyl aluminum dichloride, propyl aluminum dichloride and butyl aluminum dibromide; partially hydrogenated alkyl aluminums, for example, dialkyl aluminum hydrides such as diethyl aluminum hydride and dibutyl aluminum hydride, and alkyl aluminum dihydrides such as ethyl aluminum dihydride and propyl aluminum dihydride; and partially alkoxylated and halogenated alkyl aluminums such as ethyl aluminum ethoxychloride, butyl aluminum butoxychloride and ethyl aluminum ethoxybromide.

Organoaluminum compounds, similar to (i) above, in which two or more aluminum atoms are bonded through an oxygen or nitrogen atom may also be used. Examples are $(C_2H_5)_2AlOAl(C_2H_5)_2$, $(C_4H_9)_2AlOAl(C_4H_9)_2$, and $$(C_2H_5)_2AlNAl(C_2H_5)_2.$$
$$\quad\quad\quad\;|$$
$$\quad\quad\;\;C_2H_5$$

Examples of the compounds belonging to (ii) above are LiAl(C$_2$H$_5$)$_4$ and LiAl(C$_7$H$_{15}$)$_4$.

Among these, the alkyl aluminum halides, alkyl aluminum dihalides, or mixtures of these are especially preferred.

The cycloolefin (b) used as a starting material in step (1) is at least one unsaturated monomers selected from compounds of the following formula (I)

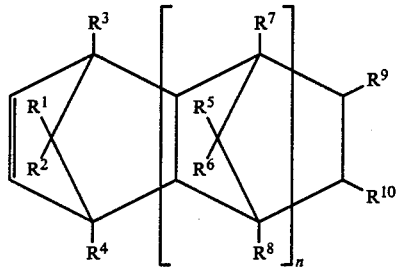
(I)

wherein n is 0 or a positive integer and R$^1$ to R$^{10}$ each represent a hydrogen or halogen atom or a hydrocarbon group, and compounds of the following formula (II)

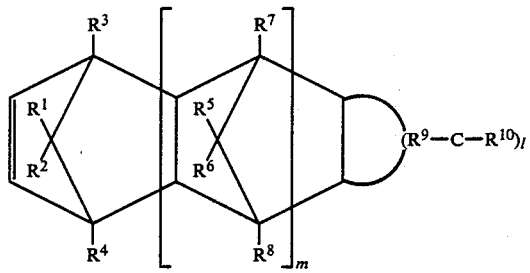
(II)

in which m is 0 or a positive integer, R$^1$ to R$^{10}$ are as defined above, and l is an integer of at least 3.

The cycloolefin of general formula (I) can be easily produced by condensing a cyclopentadiene with the corresponding olefin in accordance with the Diels-Alder reaction. The cycloolefin of general formula (II) can likewise be easily produced by condensing a cyclopentadiene with the corresponding cycloolefin by the Diels-Alder reaction.

Specific examples of the cycloolefins of general formula (I) include octahydronaphthalenes such as 1,4,5,8-dimethano-1,2,3,4,4a,5,8,8a-octahydronaphthalene, 2-methyl-1,4,5,8-dimethano-1,2,3,4,4a,5,8,8a-octahydronaphthalene, 2-ethyl-1,4,5,8-dimethano-1,2,3,4,4a,5,8,8a-octahydronaphthalene, 2-propyl-1,4,5,8-dimethano-1,2,3,4,4a,5,8,8a-octahydronaphthalene, 2-hexyl-1,4,5,8-dimethano-1,2,3,4,4a,5,8,8a-octahydronaphthalene, 2-stearyl-1,4,5,8-dimethano-1,2,3,4,4a,5,8,8a-octahydronapthtalene, 2,3-dimethyl-1,4,5,8-dimethano-1,2,3,4,4a,5,8,8a-octahydronaphthalene, 2-methyl-3-ethyl-1,4,5,8-dimethano-1,2,3,4,4a,5,8,8a-octahydronaphthalene, 2-chloro-1,4,5,8-diemthano-1,2,3,4,4a,5,8,8a-octahydronaphthalene, 2-bromo-1,4,5,8-dimethano-1,2,3,4,4a,5,8,8a-octahydronaphthalene, 2-fluoro-1,4,5,8-dimethano-1,2,3,4,4a,5,8,8a-octahydronaphthalene, 2,3-dichloro-1,4,5,8-dimethano-1,2,3,4,4a,5,8,8a-octahydronaphthalene, 2-cyclohexyl-1,4,5,8-dimethano-1,2,3,4,4a,5,8,8a-octahydronaphthalene, 2-n-butyl-1,4,5,8-dimethano-1,2,3,4,4a,5,8,8a-octahydronaphthalene, and 2-isobutyl-1,4,5,8-dimethano-1,2,3,4,4a,5,8,8a-octahydronaphthalene; and the compounds given in Table 1 below.

TABLE 1

| Chemical formula | Compound name |
|---|---|
|  | bicyclo[2,2,1]hept-2-ene |
|  | 6-methylbicyclo[2,2,1]hept-2-ene |
|  | 5,6-dimethylbicyclo[2,2,1]hept-2-ene |
|  | 1-methylbicyclo[2,2,1]hept-2-ene |
|  | 6-ethylbicyclo[2,2,1]hept-2-ene |

TABLE 1-continued

| Chemical formula | Compound name |
|---|---|
| [structure with nC$_4$H$_9$] | 6-n-butylbicyclo[2,2,1]hept-2-ene |
| [structure with iC$_4$H$_9$] | 6-i-butylbicyclo[2,2,1]hept-2-ene |
| [structure with CH$_3$] | 7-methylbicyclo[2,2,1]hept-2-ene |
| [structure with numbered positions 1-10 and two CH$_3$ groups at 5 and 10] | 5,10-dimethyltetracyclo-[4,4,0,1$^{2.5}$,1$^{7.10}$]-3-dodecene |
| [structure with two CH$_3$ groups] | 2,10-dimethyltetracyclo-[4,4,0,1$^{2.5}$,1$^{7.10}$]-3-dodecene |
| [structure with two CH$_3$ groups] | 11,12-dimethyltetracyclo-[4,4,0,1$^{2.5}$,1$^{7.10}$]-3-dodecene |
| [structure with three CH$_3$ groups] | 2,7,9-trimethyltetracyclo-[4,4,0,1$^{2.5}$,1$^{7.10}$]-3-dodecene |
| [structure with two CH$_3$ and C$_2$H$_5$ groups] | 9-ethyl-2,7-dimethyltetracyclo[4,4,0,1$^{2.5}$,1$^{7.10}$]-3-dodecene |
| [structure with two CH$_3$ and CH$_2$CH(CH$_3$)$_2$ groups] | 9-isobutyl-2,7-dimethyl tetracyclo[4,4,0,1$^{2.5}$,1$^{7.10}$]-3-dodecene |

TABLE 1-continued

| Chemical formula | Compound name |
|---|---|
| [structure with CH3 groups] | 9,11,12-trimethyltetracyclo-[4,4,0,1$^{2.5}$,1$^{7.10}$]-3-dodecene |
| [structure with C2H5 and CH3 groups] | 9-ethyl-11,12-dimethyltetracyclo[4,4,0,1$^{2.5}$,1$^{7.10}$]-3-dodecene |
| [structure with CH2CH(CH3)2 and CH3 groups] | 9-isobutyl-11,12-dimethyl-3-tetracyclo[4,4,0,1$^{2.5}$,1$^{7.10}$]-3-dodecene |
| [structure with four CH3 groups] | 5,8,9,10-tetramethyltetracyclo[4,4,0,1$^{2.5}$,1$^{7.10}$]-3-dodecene |
| [numbered hexacyclic structure] | hexacyclo[6,6,1,1$^{3.6}$,1$^{10.13}$,0$^{2.7}$,0$^{9.14}$]-4-heptadecene |
| [structure with CH3] | 12-methylhexacyclo[6,6,1,1$^{3.6}$,1$^{10.13}$,0$^{2.7}$,0$^{9.14}$]-4-heptadecene |
| [structure with C2H5] | 12-ethylhexacyclo[6.6,1,1$^{3.6}$,1$^{10.13}$,0$^{2.7}$,0$^{9.14}$]-4-heptadecene |
| [structure with CH2CH(CH3)2] | 12-isobutylhexacyclo-[6,6,1,1$^{3.6}$,1$^{10.13}$,0$^{2.7}$,0$^{9.14}$]-4-heptadecene |

TABLE 1-continued

| Chemical formula | Compound name |
|---|---|
| (structure with CH$_3$, CH$_2$CH(CH$_3$)$_2$, and two CH$_3$ groups) | 1,6,10-trimethyl-12-isobutyl-hexacyclo[6,6,1,1$^{3.6}$,1$^{10.13}$, 0$^{2.7}$,0$^{9.14}$]-4-heptadecene |
| (fused polycyclic structure) | octacyclo[8,8,1$^{2.9}$,1$^{4.7}$, 1$^{11.18}$,1$^{13.16}$,0,0$^{3.8}$,0$^{12.17}$]-5-dococene |
| (fused polycyclic structure with CH$_3$) | 15-methyloctacyclo[8,8,1$^{2.9}$, 1$^{4.7}$,1$^{11.18}$,1$^{13.16}$,0,0$^{3.8}$, 0$^{12.17}$]-5-dococene |
| (fused polycyclic structure with C$_2$H$_5$) | 15-ethyloctacyclo[8,8,1$^{2.9}$, 1$^{4.7}$,1$^{11.18}$,1$^{13.16}$,0,0$^{3.8}$, 0$^{12.17}$]-5-dococene |

Specific examples of the cycloolefins of general formula (II) are shown in Table 2 below.

TABLE 2

| Chemical formula | Compound name |
|---|---|
| (numbered bicyclic structure) | tricyclo[4,3,0,1$^{2.5}$]-3-decene |
| (structure with CH$_3$) | 2-methyl-tricyclo[4,3,0,1$^{2.5}$]-3-decene |
| (structure with CH$_3$) | 5-methyl-tricyclo[4,3,0,1$^{2.5}$]-3-decene |
| (numbered bicyclic structure) | tricyclo[4,4,0,1$^{2.5}$]-3-decene |
| (structure with CH$_3$) | 10-methyl-tricyclo[4,4,0,1$^{2.5}$]-decene |
| (structure with two CH$_3$ groups) | 1,3-dimethylpentacyclo-[6,6,1,1$^{3.6}$,0$^{2.7}$,0$^{9.14}$]-4-hexadecene |

TABLE 2-continued

| Chemical formula | Compound name |
|---|---|
| 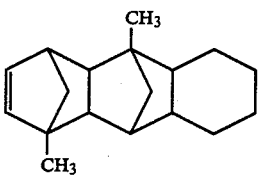 | 1,6-dimethylpentacyclo-[6,6,1,1$^{3.6}$,0$^{2.7}$,0$^{9.14}$]-4-hexadecene |
| 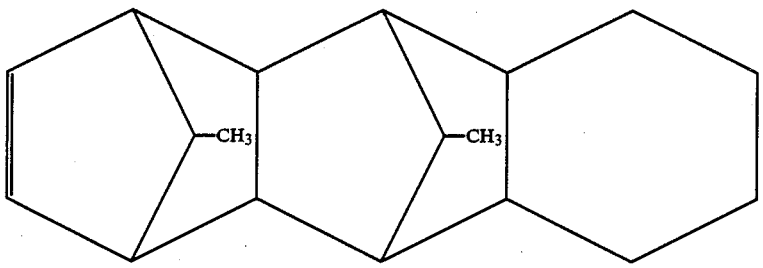 | 15,16-dimethylpentacyclo-[6,6,1,1$^{3.6}$,0$^{2.7}$,0$^{9.14}$]-4-hexadecene |
| 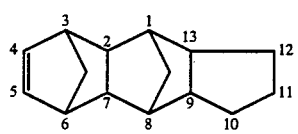 | pentacyclo[6,5,1,1$^{3.6}$,0$^{2.7}$,0$^{9.13}$]-4-pentadecene |
| 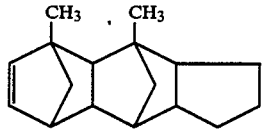 | 1,3-dimethylpentacyclo[6,5,1,1$^{3.6}$,0$^{2.7}$,0$^{9.13}$]-4-pentadecene |
| 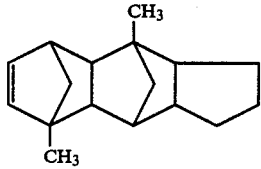 | 1,6-dimethylpentacyclo[6,5,1,1$^{3.6}$,0$^{2.7}$,0$^{9.13}$]-4-pentadecene |
| 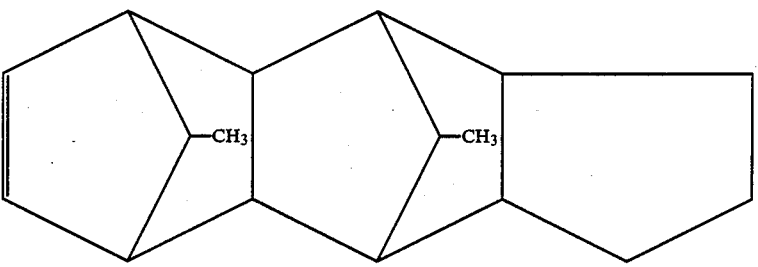 | 14,15-dimethylpentacyclo-[6,5,1,1$^{3.6}$,0$^{2.7}$,0$^{9.13}$]-4-pentadecene |
| 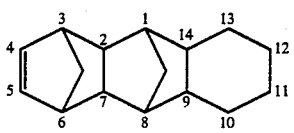 | pentacyclo[6,6,1,1$^{3.6}$,0$^{2.7}$,0$^{9.14}$]-4-hexadecene |
| 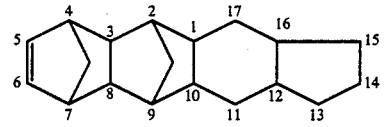 | heptacyclo[8,7,1,1$^{2.9}$,1$^{4.7}$,1$^{11.17}$,0,0$^{3.8}$,0$^{12.16}$]-5-eicosene |

TABLE 2-continued

| Chemical formula | Compound name |
|---|---|
| (structure diagram with numbered positions 1–18) | pentacyclo[8,8,1,1$^{2.9}$,1$^{4.7}$, 1$^{11.18}$,0,0$^{3.8}$,0$^{12.17}$]-5-heneicosene |

The other starting material used in step (1) is ethylene or both ethylene and an alpha-olefin having at least 3 carbon atoms. In step (1), ethylene, or both ethylene and an alpha-olefin having at least 3 carbon atoms, are copolymerized with the cycloolefin. Examples of the alpha-olefin are those having 3 to 20 carbon atoms, such as propylene, 1-butene, 4-methyl-1-pentene, 1-hexene, 1-octene, 1-decene, 1-dodecene, 1-tetradecene, 1-hexadecene, 1-octadecene and 1-eicocene.

In the polymerization step (1) of the invention, another copolymerizable unsaturated monomer may be copolymerized further in an amount which does not impair the objects of this invention. Specific examples of the other unsaturated monomer are cycloolefins such as cyclopentene, cyclohexene, 3-methylcyclohexene, cyclooctene and 3a,5,6,7a-tetrahydro-4,7-methano-1H-indene and nonconjugated dienes such as 1,4-hexadiene, 4-methyl-1,4-hexadiene, 5-methyl-1,4-hexadiene, 1,7-octadiene, dicyclopentadiene, 5-ethylidene-2-norbornene and 5-vinyl-2-norbornene.

The other unsaturated monomer may be included in an amount of less than 1 mole, preferably less than 0.9 mole, per mole of the cycloolefin units in the resulting random copolymer.

The copolymerization reaction in the polymerization step (1) of the process of the invention is carried out in the presence of a hydrocarbon medium (d). Examples of the hydrocarbon medium (d) include aliphatic hydrocarbons such as hexane, heptane, octane and kerosene, alicyclic hydrocarbons such as cyclohexane and methylcyclohexane, aromatic hydrocarbons such as benzene, toluene and xylene, and the aforesaid polymerizable unsaturated monomers. Mixtures of two or more of these may also be used.

The copolymerization reaction in the process of this invention may be carried out by a continuous method or a batchwise method. In the case of the continuous method, the starting materials for polymerization (ethylene, cycloolefin and optionally other polymerizable components), the catalyst components (the soluble vanadium compound and the organoaluminum compound) and the hydrocarbon medium are continuously fed into the polymerization reaction system, and the polymerization reaction mixture is continuously withdrawn from the polymerization reaction system. The concentration of the soluble vanadium compound fed into the polymerization reaction system is usually not more than 10 times, preferably 7 to 1 times, more preferably 5 to 1 times, the concentration of the soluble vanadium compound in the polymerization reaction system. The ratio of the aluminum atom to the vanadium atom in the polymerization reaction system, Al/V, is at least 2, preferably from 2 to 50, especially preferably from 3 to 20. Usually, each of the soluble vanadium compound and the organoaluminum compound is fed as diluted with the aforesaid hydrocarbon medium. It is desirable to dilute the soluble vanadium compound to the concentration range mentioned above. The organoaluminum compound is prepared in a concentration corresponding, for example, to not more than 50 times its concentration in the polymerization system. In the process of this invention, the concentration of the soluble vanadium compound in the copolymerization reaction system, as the vanadium atom, is usually 0.01 to 5 g-atoms/liter, preferably 0.05 to 3 g-atoms/liter.

The copolymerization reaction in the process of the invention is carried out at a temperature of −50° to 100° C., preferably −30° to 80° C., more preferably −20° to 60° C.

The average residence time in the copolymerization reaction varies depending upon the types of the starting materials, the concentrations of the catalyst components, and the reaction temperature. Usually, it is 5 minutes to 5 hours, preferably 10 minutes to 3 hours. The pressure at the time of the copolymerization reaction is usually more than 0 to 50 kg/cm$^2$, preferably more than 0 to 20 kg/cm$^2$. If desired, an inert gas such as nitrogen or argon may be present in the reaction system. Furthermore, a molecular weight controlling agent such as hydrogen may be present to adjust the molecular weight of the copolymer.

The product obtained by the polymerization step (1) of the process of this invention is a solution of the resulting cycloolefin random copolymer in the hydrocarbon medium. The concentration of the cycloolefin random copolymer contained in the solution is usually 2.0 to 10.0% by weight, preferably 4.0 to 6.0% by weight. The resulting copolymer solution further contains the soluble vanadium compound and the organoaluminum compound used as the catalyst components and a halogenation product of the cycloolefin.

In the adsorbent treatment step (2) of the process of this invention, the copolymer solution formed in the polymerization step (1), with or without a deashing treatment to remove the catalyst residue, is contacted with an adsorbent (e) containing a metal cation. The adsorbent contains a metal cation such as an alkali metal or an alkaline earth metal, preferably the former. For example, the adsorbent contains at least 5% (in a state free from water of crystallization), preferably at least 10% by weight, of the alkali metal. The adsorbent (e) has many pores having a maximum pore diameter of at least 0.5 nm, preferably at least 0.7 nm. The maximum pore diameter is calculated by assuming that the diameter of an oxygen atom is 0.28 nm.

Zeolite is an especially preferred adsorbent (e) used in the process of this invention.

Advantageously, the adsorbent (e) has a specific surface area of 100 to 1,000 m$^2$/g, preferably 200 to 1,000 m$^2$/g.

Contacting of the copolymer solution with the adsorbent may be effected by, for example, suspending the adsorbent in the copolymer solution (contacting-filtration method) or passing the copolymer solution through a layer filled with the adsorbent (fixed layer method).

The copolymer may be isolated from the copolymer solution from which the halogenation product of the cycloolefin has been removed. This can be effected, for example, by evaporating the solvent from the copolymer solution or placing the copolymer solution under a high temperature and a high pressure and then flushing it under atmospheric pressure, thereby to precipitate and recover the polymer. It is also possible to put the copolymer solution from which the above halogenation product has been removed into a polar solvent such as acetone whereby the copolymer is precipitated and separated.

The process of this invention gives a cycloolefin random copolymer containing the halogenation product of the cycloolefin which has a halogen content of below 200 ppm, for example, not more than 100 ppm, and in many cases not more than 50 ppm.

According to the process of this invention, the halogenation product of the cycloolefin formed as a by-product by the reaction of the cycloolefin and the polymerization catalyst can be removed efficiently by a simple operation. This offers the advantage that when the resulting cycloolefin random copolymer is molded at high temperatures, the corrosion of the molding machine can be circumvented.

The chlorine content of the random copolymer ascribable to the chlorination product in the following examples was measured by the following method.

About 10 mg of the random copolymer was burnt with oxygen in a flask to convert its chlorine moiety ascribed to the chlorination product into hydrogen chloride which was then caused to be absorbed by water. The resulting hydrogen chloride solution was measured by an ion chromatographic method, and the chlorine content (ppm) of the copolymer ascribed to the chlorination product in the copolymer was determined. [See, for example, H. Saito and K. Oikawa, "Bunseki Kagaku" (Analytical Chemistry), 31, E 375, 1982.]

The following Examples illustrate the process of this invention more specifically.

EXAMPLE 1

Catalyst Preparation

As a vanadium compound catalyst component, VO(OC$_2$H$_5$)Cl$_2$ was diluted with hexane to adjust the concentration of vanadium to 6.7 mmoles/liter-hexane.

As an organoaluminum compound catalyst component, ethyl aluminum sesquichloride [Al(C$_2$H$_5$)$_{1.5}$Cl$_{1.5}$] was diluted with hexane to adjust the concentration of aluminum to 107 mmoles/liter-hexane.

Polymerization

Ethylene and tetracyclododecene were copolymerized continuously in a polymerization vessel having an inside diameter of 500 mm and a reaction capacity of 100 liters and being equipped with a stirrer.

Specifically, the vanadium catalyst component was diluted with cyclohexane (polymerization solvent) so that the concentration of vanadium was not more than two times its concentration (0.6 mmole) in the cyclohexane in the polymerization vessel. The vanadium catalyst component so diluted was fed into the polymerization vessel. The ethyl aluminum sesquichloride was fed so that the Al/V atomic ratio was 8.0. Cyclohexane used as the polymerization solvent was fed at such a rate that the residence time of the reaction mixture became one hour. Ethylene and H$_2$ as a molecular weight controlling agent were fed into the gaseous-phase portion in the polymerization vessel, and tetracyclodecene, into the liquid-phase portion in the polymerization vessel. Continuous solution-polymerization of ethylene and tetracyclododecene was carried out at 11° C. under 1.8 kg/cm$^2$-G. To maintain this polymerization pressure, N$_2$ gas was introduced into the polymerization vessel. The polymerization temperature was controlled by circulating a coolant through a jacket fitted to the outside of the polymerization vessel. Under the above conditions, an ethylene/tetracyclododecene copolymer was obtained.

Deashing

Methanol, boiler water, and 25% NaOH solution as a pH adjusting agent were added to the polymer solution withdrawn from the bottom of the polymerization vessel. Thus, the polymerization reaction was stopped and the catalyst residue remaining in the polymer was removed.

Treatment with an adsorbent

One hundred milliliters of the polymer solution after deashing, and as an adsorbent, 30 g of X-type zeolite containing 15% by weight of Na and having a maximum pore diameter of 7.4 nm from which the water of crystallization was eliminated by heating in an ordinary manner were taken into a 500 ml reactor equipped with a stirrer. The mixture was stirred for 2 hours at 50° C. to treat the polymer solution with the adsorbent. The temperature was then returned to room temperature, and the mixture was filtered to separate it into the adsorbent and the polymer solution.

The polymer solution separated was concentrated by a rotary evaporator, and dried for 24 hours in a vacuum dryer kept at 100° C. to give a final product.

The chlorine content of the final product is shown in Table 3. The basic properties of the copolymer obtained as the final product are shown in Table 4.

EXAMPLES 2-4 AND COMPARATIVE EXAMPLES 2-5

Example 1 was repeated except that each of the adsorbents indicated in Table 3 was used instead of the X-type zeolite.

The results are shown in Table 3.

COMPARATIVE EXAMPLE 1

Example 1 was carried out except that the treatment with the adsorbent was not performed.

The results are shown in Table 3.

TABLE 3

| Run | | Adsorbent | | | | Chlorine content of the final copolymer product (ppm) |
|---|---|---|---|---|---|---|
| | | Type | Metal cation | | Maximum pore diameter (nm) | |
| | | | Type | Content (wt. %) | | |
| Example | 1 | X-type zeolite | Na | 15 | 0.74 | 5 |
| | 2 | Y-type zeolite | Na | 10 | 0.74 | 10 |
| | 3 | L-type zeolite | K | 9 | 0.71 | 200 |

TABLE 3-continued

| Run | | Adsorbent Type | Metal cation Type | Content (wt. %) | Maximum pore diameter (nm) | Chlorine content of the final copolymer product (ppm) |
|---|---|---|---|---|---|---|
| | 4 | offretite-type zeolite | K, Ca | 11 (total) | 0.69 | 35 |
| Comparative Example | 1 | — | — | — | — | 1100 |
| | 2 | activated charcoal | — | 0 | 8 | 800 |
| | 3 | activated alba | — | 0 | 30 | 1000 |
| | 4 | activated alumina | — | 0 | 10 | 700 |
| | 5 | silica-gel | — | 0 | 7 | 900 |

TABLE 4

| Properties | Measured values | Measurement method |
|---|---|---|
| MFR | 35–42 g/10 min. | 200° C., load 2160 g |
| Intrinsic viscosity | 0.44–0.47 dl/g | in decalin at 135° C. |
| Ethylene content | 57–62 mole % | Infrared spectroscopy |

We claim:

1. A process for producing a cycloolefin random copolymer, which comprises (1) copolymerizing (a) ethylene or both ethylene and an alpha-olefin having at least 3 carbon atoms with (b) at least one cycloolefin selected from the group consisting of unsaturated monomers of the following formula (I)

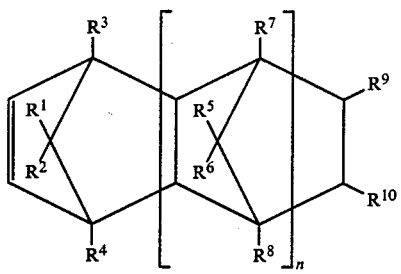

(I)

wherein n is 0 or a positive integer, and each of $R^1$ to $R^{10}$ represents a halogen atom or a hydrocarbon group, and unsaturated monomers of the following formula (II)

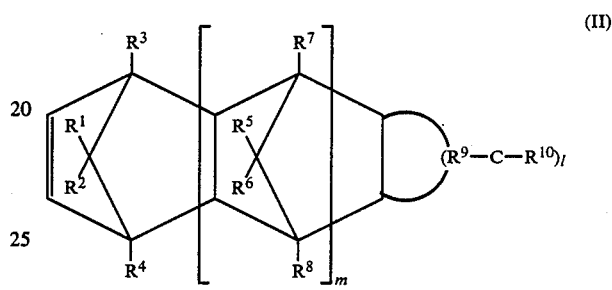

(II)

wherein m is 0 or a positive integer, and $R^1$ to $R^{10}$ are as defined above, and l is an integer of at least 3, in the presence of (c) a catalyst formed from a soluble vanadium compound and an organoaluminum compound at least one of which has halogen, in (d) a liquid phase composed of a hydrocarbon medium to form a solution of cycloolefin random copolymer containing a halogenated by-product of the cycloolefin, and (2) contacting the resulting copolymer solution with (e) an adsorbent containing a metal cation to remove the halogenated by-product from said solution.

2. The process of claim 1 in which after step (1) but before step (2), the random copolymer solution formed in step (1) is subjected to a deashing treatment.

3. The process of claim 1 in which the adsorbent containing a metal cation is an adsorbent containing at least one cation selected from alkali metal cations and alkaline earth metal cations.

4. The process of claim 1 in which the adsorbent contains at least 5% by weight, in a condition free from water of crystallization, of an alkali metal cation.

5. The process of claim 1 in which the adsorbent contains many pores and has a maximum pore diameter of at least 0.5 nm.

6. The process of claim 1 in which the adsorbent has a specific surface area of 100 to 1,000 m²/g.

7. The process of claim 1 which produces a random copolymer having a halogen content of not more than 200 ppm.

8. The process of claim 1 in which the adsorbent is a zeolite containing alkali metal cation.

* * * * *